(12) United States Patent
Lejeau et al.

(10) Patent No.: US 7,931,236 B2
(45) Date of Patent: Apr. 26, 2011

(54) DEFLECTION DEVICE FOR A STREAM BODY

(75) Inventors: Damien Lejeau, Ritterhude (DE); Petra Aumann, Stade-Bützfleth (DE); Detlev Schwetzler, Delmenhorst (DE)

(73) Assignee: Airbus Deutschland GmbH (DE)

(*) Notice: Subject to any disclaimer, the term of this patent is extended or adjusted under 35 U.S.C. 154(b) by 874 days.

(21) Appl. No.: 11/183,475

(22) Filed: Jul. 18, 2005

(65) Prior Publication Data

US 2006/0284023 A1 Dec. 21, 2006
US 2008/0142640 A9 Jun. 19, 2008

Related U.S. Application Data

(60) Provisional application No. 60/588,612, filed on Jul. 16, 2004.

(30) Foreign Application Priority Data

Jul. 16, 2004 (DE) .......................... 10 2004 034 367

(51) Int. Cl.
*B64D 39/00* (2006.01)
(52) U.S. Cl. .................... 244/135 A; 244/1 TD; 244/204
(58) Field of Classification Search .............. 244/135 A, 244/198, 200, 204, 199.4, 199.2, 200.1, 130, 244/1 TD
See application file for complete search history.

(56) References Cited

U.S. PATENT DOCUMENTS

| | | | | |
|---|---|---|---|---|
| 1,893,064 A * | 1/1933 | Zaparka | | 244/198 |
| 3,008,674 A * | 11/1961 | Abraham | | 244/135 A |
| 3,360,221 A * | 12/1967 | Heskestad | | 244/208 |
| 3,399,848 A * | 9/1968 | Weiss | | 244/198 |
| 4,095,761 A | 6/1978 | Anderson et al. | | 244/135 |
| 4,619,423 A * | 10/1986 | Holmes et al. | | 244/130 |
| 4,685,643 A | 8/1987 | Henderson et al. | | 244/199 |
| 4,786,009 A | 11/1988 | Rao et al. | | 244/75 |
| 4,813,635 A * | 3/1989 | Paterson et al. | | 244/130 |
| 5,058,837 A * | 10/1991 | Wheeler | | 244/200.1 |
| 5,069,402 A | 12/1991 | Wortman | | 244/130 |
| 5,088,665 A | 2/1992 | Vijgen et al. | | 244/200 |
| 6,484,971 B2 * | 11/2002 | Layukallo | | 244/130 |
| 6,994,294 B2 * | 2/2006 | Saggio et al. | | 244/135 A |
| 2002/0005459 A1 | 1/2002 | Deslandes et al. | | 244/118.1 |
| 2004/0046086 A1 * | 3/2004 | Dixon et al. | | 244/199 |

FOREIGN PATENT DOCUMENTS

| | | |
|---|---|---|
| DE | 3246737 | 6/1983 |
| DE | 86 32 288.5 | 4/1987 |
| DE | 86 32 288 U1 | 4/1987 |
| DE | 199 64 114 A1 | 7/2001 |
| DE | 100 22 455 | 11/2001 |
| GB | 1152982 | 5/1969 |
| GB | 2 112 077 | 7/1983 |
| JP | 2002053099 A | 2/2002 |

* cited by examiner

*Primary Examiner* — Timothy D Collins
*Assistant Examiner* — Philip J Bonzell
(74) *Attorney, Agent, or Firm* — Ostrolenk Faber LLP

(57) ABSTRACT

The present application describes to a deflection device, for example, for a blunt stream body. The deflection device has an edge, which, for example, can be mounted to the stream body. In an advantageous manner, the deflection device allows an influencing of the slipstream in such a way that turbulences, which are connected with the slipstream and form downstream of blunt stream bodies, have as little influence as possible on the dragged object in order to avoid the formation of building-up motions of the dragged object, which lead to instabilities.

16 Claims, 3 Drawing Sheets

DEFLECTION DEVICE FOR A STREAM BODY

REFERENCE TO RELATED APPLICATIONS

This application claims the benefit of the filing date of U.S. Provisional Patent Application No. 60/588,612 filed Jul. 16, 2004, and of the German Patent Application No. 10 2004 034 367.5 filed Jul. 16, 2004, the disclosure of which is hereby incorporated herein by reference.

FIELD OF THE INVENTION

The present invention relates to the aeronautics of, for example, an aircraft. In particular, the present invention relates to a deflection device for influencing a slipstream of a body subjected to an airflow as well as to a corresponding method.

BACKGROUND OF THE INVENTION

In aviation, it is frequently necessary to drag bodies having arbitrary properties downstream of aircraft in flight. This can have various reasons. In the case of measurements of the atmosphere, for example, probes have to be dragged through the air in order to obtain meteorological data. Alternatively, in the case of tanker aircraft during flight, refueling pods with hoses are used to transfer, for example, fuel or water from a supply aircraft to another aircraft, which is to be supplied. In most cases, aircraft move through the air at very high velocities. Therefore, a turbulent slipstream arises downstream of the aircraft and of a body dragged by the aircraft. The properties of this slipstream depend on the construction shape of the bodies moved through the air. Herein, so-called streamlined construction types have a positive effect. Here, the design of the outer shape has the effect that the air vortices arising downstream of the body will turn out to be as weak as possible.

However, it is not always possible to use this advantageous shape. In the case of a refueling pod, for example, it must be possible to lead out a hose at the rear end of the refueling pod. For this purpose, an opening ensuring the exit of the hose and of its stabilizing cage has to be provided at this end. Therefore, the opening has a larger dimension, due to which a blunt construction shape is generated in the rear region of the refueling pod. In terms of fluidity, this shape has disadvantages, as vortices and turbulences, which can influence an object present in the slipstream and can deteriorate its stability, form downstream of such a blunt stream body.

If it is tried to operate a drag probe or a refueling hose downstream of a blunt stream body, an aerodynamic impulse on the dragged object is potentially generated by the turbulences, which unintentionally sets the object in motion.

SUMMARY OF THE INVENTION

According to an exemplary embodiment of the present invention, a deflection device for influencing a slipstream of a body subjected to an airflow is provided. The deflection device comprises an edge, wherein the edge has a face, which is bent or angled toward the local stream direction. Substantially, the deflection device can be mounted at the end of the body, wherein the body can be, for example, an aerodynamic vehicle or a flying body, a probe or a missile.

The deflection device influences the slipstream downstream of the stream body in, it is believed, a positive manner. If the body streamed against is a stream body having a blunt end, strong turbulences can arise downstream of the stream body due to the slipstream. The mounting of a deflection device at the end of the body may have the effect that the slipstream and therefore the turbulences evoked are deflected out of the region immediately downstream of the stream body to the greatest possible extent. There can still remain a region where turbulences occur. By means of bending the face of the deflection device toward the local stream direction, however, this region can be shifted, so that the turbulences can no longer build up immediately downstream of the stream body, but substantially arise outside the cross section of the stream body. A dragged object, which would be located in the region immediately downstream of the stream body, would therefore be rid of the effect of the turbulences to the greatest possible extent. Therefore, only a small working surface of the dragged object is presented to the turbulences, due to which the stability of the dragged object, which is related to the length of the region influenced by the turbulences, may be enhanced. If the dragged object is, for example, a refueling hose, the enhanced stability can signify that the refueling process of an aircraft during flight is simplified and accelerated, if not actually rendered possible. In addition, the trapping of the refueling hose by the aircraft to be refueled may thereby be simplified and rendered possible.

According to a further exemplary embodiment of the present invention, the aerodynamic vehicle is a blunt stream body.

The blunt construction shape of the stream body can be used for the formation of, for example, an outlet for a hose or a probe. The aerodynamic vehicle can develop a sort of coil-up device for a hose, which fixes and protects the hose during flight. In addition, further functional elements can be provided in this device, for example pumps or valves, which are required for a refueling process.

According to a further exemplary embodiment of the present invention, a drag probe can be mounted to the aerodynamic vehicle. During flight, a region of turbulence arises downstream of the body in stream direction. If a first length of a first portion of the drag probe, which is located in the region of turbulence during flight with the mounted deflection device, is compared to a second length of a second portion of the drag probe, which is located in the region of turbulence during flight without the deflection device, it can be observed that the second length is longer than the first length.

Owing to the shorter length of the first portion of the drag probe, which is located in the region of turbulence during flight with the mounted deflection device, the drag probe presents less working surface to turbulences than in the case of flying without the deflection device. In an advantageous manner, the dragged object is thereby exposed to fewer forces. This can lead to a higher stability of the dragged object, for example the drag probe. In other words: The turbulences can set the drag probe in an irregular and chaotic motion, which is not desired. The motion can turn out to be stronger, the higher the length of the portion of the drag probe, which is located in the region of turbulence. It can be advantageous to reduce the sphere of influence of the turbulences on the drag probe by means of mounting the deflection device to the stream body. Thereby, the drag probe, i.e. the "flying" properties of the drag probe, may be stabilized.

According to a further exemplary embodiment of the present invention, the drag probe can be designed in the form of a refueling hose.

In an advantageous manner, the deflection device can be used for stabilizing refueling hoses on tanker aircraft, such as the A310-MRTT (Multi-Role Tanker Transport). Thereby, the refueling process of aircraft during flight may be simplified and accelerated, as unnecessary maneuvers for trapping the refueling hose can be avoided and therefore productive operation costs are believed to be reduced.

According to a further exemplary embodiment of the present invention, the deflection device is designed for stream velocities of about 50 km/h to about 1,300 km/h, in particular for stream velocities of about 200 km/h to 1,300 km/h and further in particular for stream velocities of about 600 km/h to 1,300 km/h.

The function of the deflection device depends on the respective stream velocity. In an advantageous manner, the deflection device may be designed for typical stream velocities as occurring with aircraft in flight. Therefore, it may be possible to apply the deflection device without lengthy optimization in the case of blunt stream bodies for aircraft, like for example a refueling pod. It may therefore also be possible to construct the deflection device in the form of a simple retrofit kit. Given the indicated stream velocities, money and time for the optimization of the deflection device can be saved in an advantageous manner. As each type of modification of an aircraft requires a special certification, which is usually proven by means of flight experimentation, a great saving potential arises during the flight experimentation stage with this simple solution in form of the deflection device.

According to a further exemplary embodiment of the present invention, the face of the deflection device can be bent or angled in a way that is essentially vertical to the local stream direction.

By means of bending in a way that is essentially vertical to the local stream direction, it can be accomplished that the maximum effect may be achieved. The effect of faces on streams depends on the size of the face cross section, which is vertical to the local stream direction. In the case of faces, which are bent in a way that is essentially vertical to the local stream direction, it can be ensured that the maximum face area of the deflection device is available as effective area. Thus, an efficient effect can be achieved.

According to a further exemplary embodiment of the present invention, a method for reducing hose-out instabilities of a refueling hose dragged downstream of a refueling pod of a tanker aircraft is indicated. Herein, hose-out instability means that turbulences stimulate the dragged refueling hose to perform vibrations, which can build up to strong movements of the refueling hose. The refueling pod is streamed against in a stream direction. By means of deflection of a stream angular to the stream direction, the length of a region of the refueling hose, which is located downstream of the refueling pod during flight, is influenced. The deflection essentially occurs in stream direction at the end of the refueling pod.

In an advantageous manner, the length of a portion of the refueling hose, which is affected by the turbulences, is influenced by the deflection of the stream. The shorter the length of the portion, the more stable the movement of the hose. A refueling process can be simplified and possibly accelerated by means of the stable position of the hose.

According to a further exemplary embodiment of the present invention, the deflection of the stream occurs in a way that is essentially vertical to the local stream direction.

By means of the deflection of the stream, which is performed in a way that is essentially vertical to the stream direction, a working surface as large as possible can be opposed to the stream. Thereby, an effective influencing of the slipstream can be achieved in an advantageous manner.

In the following, embodiments of the present invention are described with reference to the following Figures.

DESCRIPTION OF PREFERRED EMBODIMENTS OF THE INVENTION

Figure 1:
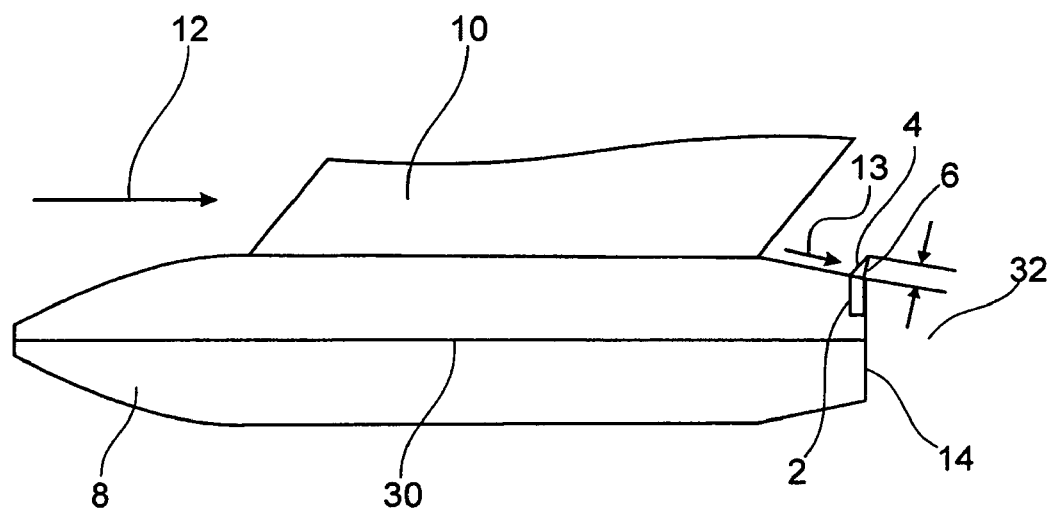
FIG. 1 shows a two-dimensional side view of a refueling pod with the deflection device mounted in the rear region, according to an exemplary embodiment of the present invention.

FIG. 1 shows an elementary two-dimensional side view of a refueling pod with the deflection device mounted in the rear region, according to an exemplary embodiment of the present invention. The refueling pod 8 is a stream body, whose front quarter is constructed to form a point. When moving, the stream body is subjected to an airflow in the stream direction 12. The front end of the refueling pod 8 eases a motion against the stream direction 12 due to the pointed construction shape, which corresponds to a streamlined shape. Air, through which, for example, the stream body 8 is moving, is displaced by the stream body in its front quarter and streams closely along the stream body toward the rear end. The stream body is an axially symmetric body with the rotation axis 30. In the middle region, in connection with the front quarter, the refueling pod 8 has a constant diameter. In the rear quarter, the up to this point constant diameter tapers until it forms a blunt region 14, which can for example be an opening, at the end.

This opening 14 can, for example, be used to lead out a drag probe 20 or a refueling hose. The refueling pod 8 serves for the protection of the protruding and dragged object 20. The refueling pod 8, for example, clasps around a potentially present fixture or take-up roller of the hose and deflects the stream 12 around these elements, which are in most cases not constructed in a streamlined form.

In order to protect a region 32, which is located downstream of the refueling pod 8, when viewed in stream direction 12, as well as possible against turbulences of the slipstream, a deflection device 2 is mounted to the refueling pod 8. The deflection device 2 comprises an edge having a face 4, which opposes almost vertically to the stream 12 and a face 6, which is facing away from this direction. At the rear end of the refueling pod 8, the deflection device 2 is constructed in a radial shape around the opening 14 located in the half of the refueling pod 8, which is located above the rotation axis 30. The optimal position and angle relative to the local stream 13 of the deflection device 2 in the rear quarter of the refueling pod 8 can be ascertained experimentally (or by means of calculation), just like the optimal height of the deflection device 2, which protrudes above the refueling pod 8 and is predetermined by the length of the face 6. For example, the length of the face 6 can be about 25 mm. The connection of the refueling pod 8 with an aircraft is achieved by means of a joining element 10, which is, for example, mounted to a wing or to the fuselage of an aircraft and which is shaped as aerodynamically as possible in order to offer the least possible aerodynamic drag.

Figure 2:
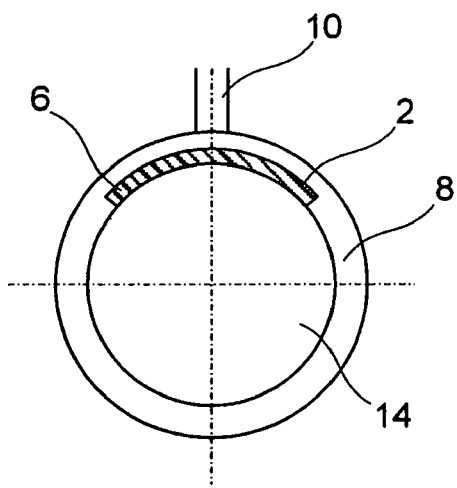
FIG. 2 shows an elementary two-dimensional rear view of a refueling pod with the deflection device mounted in the rear region, according to an exemplary embodiment of the present invention.

FIG. 2 shows an elementary two-dimensional rear view of a refueling pod 8 with a deflection device 2 mounted in the rear region, according to an exemplary embodiment of the present invention. It can be seen from the illustration that the refueling pod 8 is an axially symmetric body. Likewise, the opening 14 is shaped in an axially symmetric manner. The deflection device 2 is arranged in radial direction around the opening 14. The length of the deflection device is shorter than the length of the circumference of the opening 14. The deflection device 2 is formed in the upper half of the refueling pod 8 and the height of the deflection device 2, which is formed by the length of the face 6, can, for example, be 25 mm.

Figure 3:
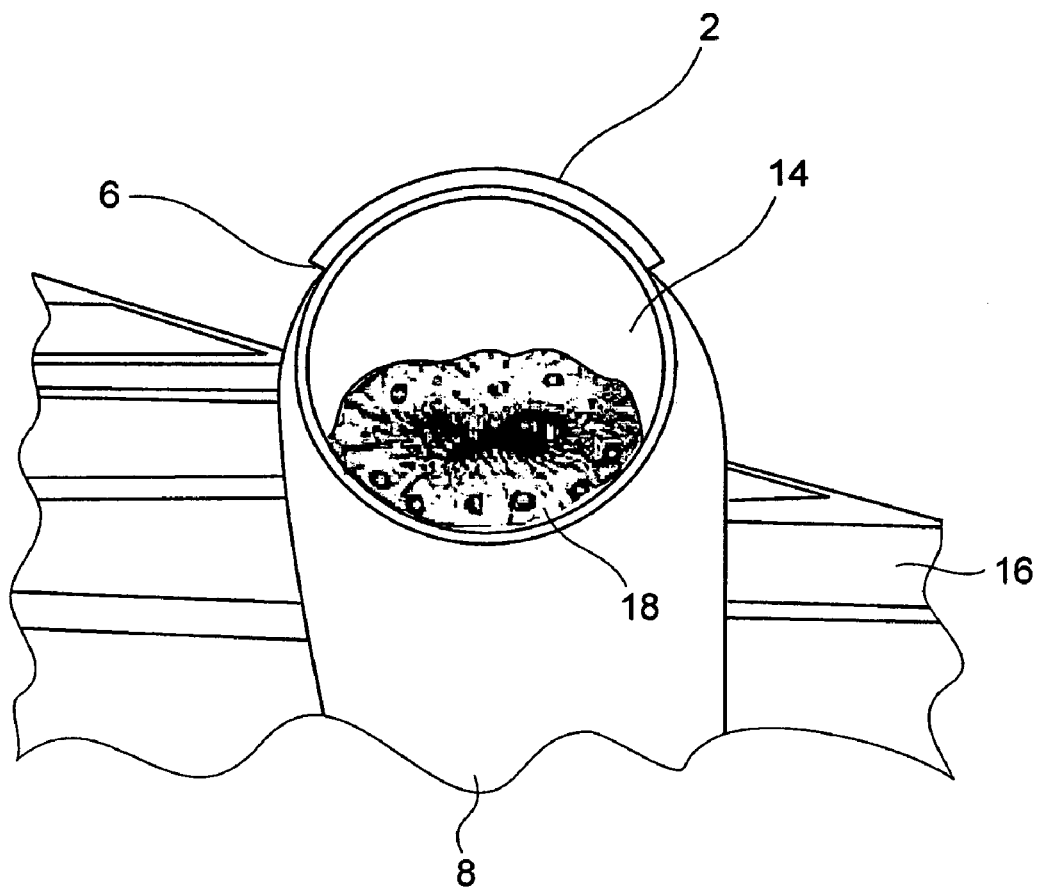
FIG. 3 shows a three-dimensional rear view of an exemplary embodiment of the present invention.

In FIG. 3 a three-dimensional rear view of an advantageous embodiment of the present invention is shown. The illustration shows the mounting of the refueling pod 8 to an aircraft wing 16. The deflection device 2 is formed in the upper half of the refueling pod 8 and attached to the opening 14. The attachment at the opening 14 allows the deflection device 2 to also be retrofit to already existing refueling pods 8 in the form of a retrofit kit. The opening 14 forms a blunt terminal end of the refueling pod 8. Such a blunt end is unfavorable for the aerodynamic properties of a body, as vortices can easily arise downstream of a blunt terminal end of a body. However, the opening 14 must have a certain magnitude in order to facilitate the exit of a refueling hose and its stabilizing cage 18.

Figure 4:
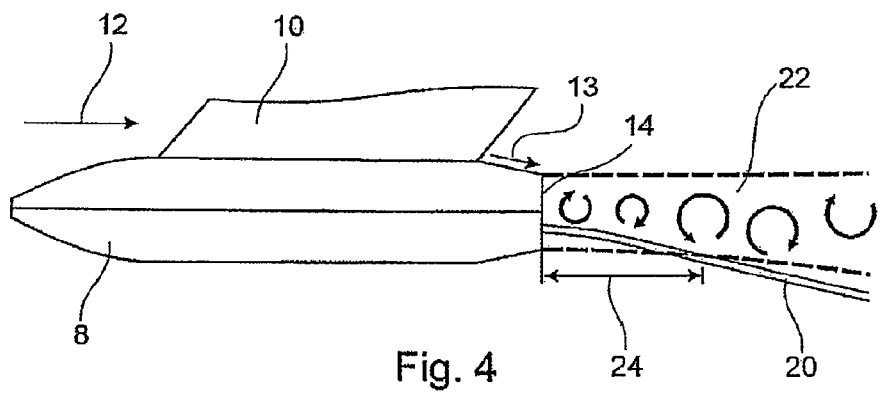
FIG. 4 shows a schematized two-dimensional side view of the effect of a slipstream on a dragged probe without deflection device.

FIG. 4 shows a schematized two-dimensional side view of the effect of a slipstream on a dragged probe 20 without deflection device. The illustration shows a refueling pod 8 with a drawn out probe 20. The probe 20 exits the refueling pod 8 through the opening 14 at the rear end of the refueling pod 8. Owing to the gravitational force of the probe 20, the latter is shaped in the direction toward the lower surface of the refueling pod 8. On the one hand, the stream 12 arising due to the motion of the refueling pod 8 counteracts the force that deflects the probe 20 in the direction toward the lower surface of the refueling pod 8. Therefore, the probe 20 exhibits an only slightly bent shape. On the other hand, however, the stream 12, in interaction with the opening 14 and the blunt end of the refueling pod 8 resulting therefrom, also has the effect that vortices form in the rear region 22 of the refueling pod 8 owing to the slipstream of the stream 12. These vortices act on the portion of the length 24 of the probe 20 that is located in the region 22 of the vortex.

The region 22 follows downstream of the refueling pod 8 and exhibits a nearly horizontal form as its distance from the opening 14 increases. As the distance from the opening 14 increases, a slight widening of the diameter of the region 22 can be observed. The length 24 of the probe 20, which is located in the region of the vortices 22, influences the stability of the probe 20. The shorter this length of influence 24 is, the more stable the probe 20 moves during flight. Therefore, FIG. 4 shows a construction shape unfavorable for the stability of the probe 20.

Figure 5:
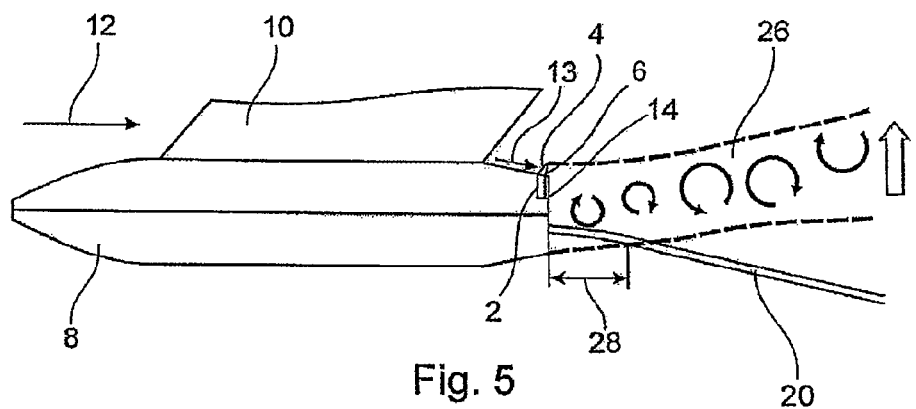
FIG. 5 shows a schematized two-dimensional side view of the effect of a slipstream on a dragged probe with deflection device.

FIG. 5 shows a schematized two-dimensional side view of the effect of a slipstream on a dragged probe 20 with deflection device 2. The illustration shows the effect of a deflection device 2, which is mounted to a refueling pod 8, on the region of the slipstream 26 and the turbulences connected therewith downstream of a blunt end 14 of the refueling pod 8. Owing to the forces working on it, the probe 20 exhibits a bend directed toward the lower side of the refueling pod 8. Owing to the deflection device 2, the region of the vortex 26 reaches beyond the upper side of the refueling pod 8 as the distance from the refueling pod 8 increases. Herein, the region borders proceed nearly parallel, wherein the diameter of the region 26 slightly widens as the distance from the refueling pod 8 increases.

Owing to the bend of the probe 20, which proceeds in the direction toward the lower side of the refueling pod 8, and to the region of the vortex 26, which proceeds in the direction toward the upper surface and toward the deflection device 2 of the refueling pod 8, the turbulences act on the probe 20 only over a short length 28 of a portion of the probe 20. In comparison with the situation depicted in FIG. 4, the effect of the slipstream on the probe 20 is minor, which enhances the stability of the probe 20 in an advantageous manner. The probe 20 behaves more stably in comparison with the situation depicted in FIG. 4. Thereby, a refueling process is simplified and can be performed faster. A building-up motion of the probe 20 is thereby reduced.

In addition, it is to be noted that "comprising" does not exclude other elements or steps and that "a" does not exclude a plurality. It is further to be noted that properties or steps, which have been described with reference to one of the above embodiments, can also be used in combination with other properties or steps of other above-described embodiments. Reference marks in the claims are not to be considered as restriction.

What is claimed is:

1. A deflection device for deflecting a slipstream of a refueling pod subjected to an airflow, the airflow having a first flow direction and a second local flow direction adjacent to a surface of the refueling pod, a circumference of the refueling pod taken along a cross section transverse to a rotational axis of the refueling pod, the refueling pod including a dragged refueling hose with a first portion, the first portion being an entire length of the refueling hose that is located completely in a first region of turbulence, the first region of turbulence being a region of the slipstream during flight downstream of the refueling pod in the first flow direction when the deflection device is mounted on the refueling pod, the refueling pod having an end at a rear end side of the refueling pod, the deflection device having a principal extent positioned along the circumference of the refueling pod; and the deflection device comprising a partial ring shape having a face positioned to oppose vertically the second local flow direction, the face having a rear surface, wherein the refueling pod comprises an aerodynamically shaped joining element having a longitudinal extent configured to mount the refueling pod to an aircraft, wherein both the deflection device and the joining element are mounted above the rotational axis of the refueling pod;

wherein the deflection device is mounted at the end of the refueling pod and is shaped to deflect the slipstream such that a central axis of the slipstream proceeds in a direction toward a horizontal plane perpendicular to and contacting the rear surface of the deflection device as a distance from the refueling pod increases and such that the first portion of the dragged refueling hose is shorter than a second portion of the dragged refueling hose, the second portion being an entire length of the dragged refueling hose that is located in a second region of turbulence, the second region of turbulence being a region of the slipstream during flight downstream of the refueling pod in the first flow direction when the refueling pod is flown without the deflection device.

2. The deflection device according to claim 1, wherein the refueling pod is a blunt stream body.

3. The deflection device of claim 1, wherein the refueling pod has a top surface and the deflection device is configured to be mounted to the top surface.

4. The deflection device according to claim 1, wherein the refueling pod comprises a joining element configured to join the refueling pod with a wing or fuselage of an aircraft and having a longitudinal extent positioned along a first plane, and wherein the principal extent of the deflection device is positioned so as to be intersected by the first plane.

5. The deflection device according to claim 1, wherein the height of the deflection device is about 25 mm.

6. The deflection device according to claim 1, wherein the deflection device is for stream velocities of 50 km/h to about 1,300 km/h.

7. The deflection device according to claim 6, wherein the deflection device is for stream velocities in a range of 200 km/h to 1,300 km/h.

8. The deflection device according to claim 6, wherein the deflection device is for stream velocities in a range of 600 km/h to 1,300 km/h.

9. In combination, the deflection device of claim 1 and the refueling pod.

10. The combination of claim 9, wherein the refueling pod is mounted on an aircraft or an aircraft fuselage and wherein the deflection device is mounted to the end of the refueling pod such that the face is vertical to the second local flow direction.

11. The combination of claim 10, wherein the refueling pod has a surface along a top of the refueling pod during flight of the refueling pod and the deflection device is mounted so as to project up from the top surface of the refueling pod.

12. The combination of claim 9, wherein the deflection device has the partial ring shape and is positioned annularly in a radial direction of the refueling pod.

13. The combination of claim 12, wherein the refueling pod includes an opening in the rear end side and the deflection device is positioned to partially surround the opening.

14. A method for reducing hose-out instabilities of a refueling hose of a tanker aircraft dragged downstream of a refueling pod subjected to a first airflow in a first flow direction and a second local airflow adjacent to the refueling pod having a second local flow direction, a circumference of the refueling pod taken along a cross section transverse to the rotational axis of the refueling pod, a deflection device having a partial ring shape and a principal extent positioned along the circumference of the refueling pod, wherein the refueling pod comprises an aerodynamically shaped joining element having a longitudinal extent configured to mount the refueling pod to an aircraft, wherein both the deflection device and the joining element are mounted above the rotational axis of the refueling pod, the method comprising the following step:

controlling a length of a region of the refueling hose located in a region of a slipstream downstream of the refueling pod during flight by deflecting a portion of at least one of the first and second airflows angularly to a direction of the second local flow, wherein the deflecting is performed by the deflection device positioned above the rotational axis of the refueling pod and positioned at a rear end side of the refueling pod having a face positioned to oppose vertically the second local flow direction, the face having a rear surface, and the deflection device shaped to deflect a central axis of the slipstream such that the slipstream proceeds in a direction toward a horizontal plane perpendicular to and contacting the rear surface of a deflection device as a distance from the refueling pod increases and by directing a portion of at least one of the first airflow and the second airflow in a direction away from the refueling hose such that the refueling hose includes a first portion shorter than a second portion of the refueling hose, the first portion being an entire length of the refueling hose that is located completely in a first region of turbulence, the first region of turbulence being a region of the slipstream during flight downstream of the refueling pod in the first flow direction when the deflection device is mounted on the refueling pod, and the second portion being an entire length of the refueling hose that is located completely in a second region of turbulence, the second region of turbulence being a region of slipstream during flight downstream of the refueling pod in the first flow direction when the refueling pod is flown without the deflection device.

15. The method according to claim 14, wherein the directing of the portion of the at least one of the first and second airflows is performed perpendicularly to the second local flow direction.

16. A method for directing by means of a deflection device a slipstream of a refueling pod subjected to an airflow, the airflow having a first flow direction and a second local flow direction adjacent to a surface of the refueling pod, a circumference of the refueling pod taken along a cross section transverse to a rotational axis of the refueling pod, wherein the refueling pod comprises an aerodynamically shaped joining element having a longitudinal extent configured to mount the refueling pod to an aircraft wherein both the deflection device and the joining element are mounted above the rotational axis of the refueling pod, and the deflection device having a partial ring shape and a principal extent positioned along the circumference of the refueling pod and comprising a face at a vertical angle to the second local flow direction, the method comprising:

mounting the deflection device above a rotational axis of the refueling pod at a rear end side of the refueling pod;

mounting a dragged refueling hose to the refueling pod, wherein during flight the slipstream, a region of turbulence downstream of the refueling pod in the first flow direction exists, wherein the dragged refueling hose has a first portion, the first portion being an entire length of the dragged refueling hose that is located completely in a first region of turbulence, the first region of turbulence being a region of the slipstream during flight downstream of the refueling pod in the first flow direction when the deflection device is mounted on the refueling pod, and wherein the deflection device is positioned and shaped to deflect the slipstream such that a central axis of the slipstream proceeds in a direction toward a horizontal plane perpendicular to and contacting a rear surface of the deflection device as a distance from the refueling pod increases and such that the first portion of the dragged refueling hose is shorter than a second portion of the dragged refueling hose, the second portion being an entire length of the dragged refueling hose that is located completely in a second region of turbulence, the second region of turbulence being a region of the slipstream during flight downstream of the refueling pod in the first flow direction when the refueling pod is flown without the deflection device.

* * * * *